(12) United States Patent
Akita et al.

(10) Patent No.: US 8,780,690 B2
(45) Date of Patent: *Jul. 15, 2014

(54) METHOD AND APPARATUS FOR INTERLEAVING SEQUENCE ELEMENTS OF AN OFDMA SYNCHRONIZATION CHANNEL

(75) Inventors: Hidenori Akita, Higashimurayma (JP); Masaya Fukuta, Meguro-ku (JP); Hiroshi Hayashi, Nishitokyo (JP); Kevin L. Baum, Rolling Meadows, IL (US); Brian K. Classon, Palatine, IL (US); Vijay Nangia, Algonquin, IL (US); Robert T. Love, Barrington, IL (US); Kenneth A. Stewart, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/350,559

(22) Filed: Jan. 13, 2012

(65) Prior Publication Data

US 2012/0113927 A1    May 10, 2012

Related U.S. Application Data

(63) Continuation of application No. 13/052,777, filed on Mar. 21, 2011, which is a continuation of application No. 11/351,275, filed on Feb. 8, 2006, now Pat. No. 7,911,935.

(51) Int. Cl.
*H04J 11/00* (2006.01)
(52) U.S. Cl.
USPC .................. 370/208; 370/350; 455/436
(58) Field of Classification Search
None
See application file for complete search history.

(56) References Cited

U.S. PATENT DOCUMENTS

| 5,353,352 A | 10/1994 | Dent et al. |
| 5,748,677 A | 5/1998 | Kumar |
| 6,307,864 B1 | 10/2001 | Fensch et al. |
| 6,385,264 B1 | 5/2002 | Terasawa et al. |
| 6,567,383 B1 | 5/2003 | Bohnke |
| 6,606,296 B1 | 8/2003 | Kokkkonen |
| 6,654,339 B1 | 11/2003 | Bohnke et al. |
| 6,795,689 B1 | 9/2004 | Ogren et al. |
| 6,822,999 B1 | 11/2004 | Lee et al. |
| 6,834,046 B1 | 12/2004 | Hosur et al. |
| 7,095,811 B1 | 8/2006 | Shikh-Bahaei et al. |
| 7,142,584 B1 | 11/2006 | Bomer et al. |
| 7,336,600 B2 | 2/2008 | Feng et al. |

(Continued)

OTHER PUBLICATIONS

NTT DoCoMo et al., "SCH Structure and Cell Search Method in E-UTRA Downlink", R1-060042, 3GPP TSG RAN WG1 LTE Ad Hoc Meeting, Jan. 23-25, 2006.*

(Continued)

*Primary Examiner* — Khoa Huynh

(57) ABSTRACT

A method and apparatus is provided for transmitting an orthogonal frequency domain multiple access (OFDMA) signal including a synchronization channel signal transmitted including a plurality of sequence elements interleaved in time and frequency. The synchronization channel signal sequence elements enable an initial acquisition and cell search method with low computational load by providing predetermined time domain symmetry for common sequence elements in OFDMA symbol periods for OFDMA symbol timing detection and frequency error detection in an OFDMA system supporting multiple system bandwidths, both synchronized and un-synchronized systems, a large cell index and an OFDMA symbol structure with both short and long cyclic prefix length.

32 Claims, 11 Drawing Sheets

(56) References Cited

U.S. PATENT DOCUMENTS

| | | | |
|---|---|---|---|
| 7,911,935 B2 | 3/2011 | Akita et al. | |
| 7,983,143 B2 | 7/2011 | Akita et al. | |
| 2002/0027898 A1 | 3/2002 | Tanno et al. | |
| 2002/0085641 A1* | 7/2002 | Baum .................... | 375/260 |
| 2002/0181390 A1 | 12/2002 | Mody et al. | |
| 2003/0026295 A1 | 2/2003 | Baum et al. | |
| 2003/0072255 A1 | 4/2003 | Ma et al. | |
| 2003/0072293 A1 | 4/2003 | Fischer | |
| 2003/0112745 A1 | 6/2003 | Zhuang et al. | |
| 2003/0123381 A1 | 7/2003 | Zhuang et al. | |
| 2003/0193926 A1 | 10/2003 | Lindoff et al. | |
| 2004/0085946 A1* | 5/2004 | Morita et al. ............ | 370/342 |
| 2004/0252629 A1 | 12/2004 | Hasegawa et al. | |
| 2005/0002369 A1 | 1/2005 | Ro et al. | |
| 2005/0018712 A1 | 1/2005 | Howard | |
| 2005/0163238 A1 | 7/2005 | Fujii | |
| 2005/0226140 A1 | 10/2005 | Zhuang et al. | |
| 2005/0286465 A1 | 12/2005 | Zhuang et al. | |
| 2006/0009227 A1 | 1/2006 | Cudak et al. | |
| 2006/0018365 A1 | 1/2006 | Jung et al. | |
| 2006/0039451 A1 | 2/2006 | Zhuang et al. | |
| 2006/0062196 A1 | 3/2006 | Cai et al. | |
| 2006/0088115 A1 | 4/2006 | Chen et al. | |
| 2006/0109780 A1 | 5/2006 | Fechtel | |
| 2006/0114910 A1 | 6/2006 | Sindhushayana et al. | |
| 2006/0120473 A1 | 6/2006 | Baum | |
| 2006/0245472 A1 | 11/2006 | Pan et al. | |
| 2006/0256708 A1 | 11/2006 | Wang et al. | |
| 2007/0058595 A1 | 3/2007 | Classon et al. | |
| 2007/0116094 A1 | 5/2007 | Parts et al. | |
| 2007/0116166 A1 | 5/2007 | Parts et al. | |
| 2007/0133390 A1 | 6/2007 | Luo et al. | |
| 2007/0140106 A1 | 6/2007 | Tsai et al. | |
| 2007/0165588 A1 | 7/2007 | McCoy | |
| 2008/0039107 A1 | 2/2008 | Ma et al. | |
| 2011/0211542 A1 | 9/2011 | Akita et al. | |
| 2011/0268079 A1 | 11/2011 | Akita et al. | |
| 2011/0268104 A1 | 11/2011 | Akita et al. | |

OTHER PUBLICATIONS

Tufvesson, F., et al., "Time and Frequency Synchronization for OFDM using PN-Sequence Preambles"; Proceedings of IEEE Vehicular Technology Conference, 1999.

Lienhart, R., et al., "On the Importance of Exact Synchronization for Distributed Audio Signal Processing"; Proceedings. 2003 IEEE Workshop on Applications of Signal Processing to Audio and Acoustics, WASPAA, 2003.

NTT DoCoMo, Fujitsu, Mitsubishi Electric Corporation, NEC, Panasonic, Sharp, Toshiba Corporation; TSG-RAN WG1#42bis; "Basic Structure of Control Channel and Synchronization Channel for Scalable Bandwidth in Evolved UTRA Downlink"; R1-051 147; Oct. 10-14, 2005.

International Search Report PCT/US07/61179 dated Nov. 2, 2007.

Motorola, Cell Search and Initial Acquisition for EUTRA, R1-060014, 3GPP TSG RANI LTE Ad Hoc Meeting, Jan. 23-25, 2006.

Catt et al., "Cell Search procedure of EUTRA TDD system for the initial synchronization", R1-060216, 3GPP TSG RAN WG1LTE Ad Hoc Meeting, Jan. 23-25, 2006.

Etri, Cell Search Scheme for EUTRA & TP, R1-060072, 3GPP RAN WG1 LTE Ad Hoc Meeting, Jan. 23-25, 2006.

Texas Instruments, Downlink synchronization channel schemes for E-UTRA, R1-051057, 3GPP TSG RAN WG1#42bis, Oct. 10-14, 2005.

Huawei, "Cell-specific signals for initial synchronization and cell identification", R1-060225, 3GPP TSG RAN WG1 LTE Ad Hoc Meeting, Jan. 23-25, 2006.

Alcatel, Downlink OFDM resource allocation structure for E-UTRA, R1-060208, 3GPP TSG RAN WG1 LTE Ad Hoc Meeting, Jan. 25, 2006.

USPTO Office Action for U.S. Appl. No. 13/183,729 dated Oct. 25, 2013.

Ericsson, "E-UTRA Cell Search", R1-0601 05, 3GPP TSG RAN WG1 L TE Ad Hoc Meeting, Jan. 23-25, 2006.

NTT DoCoMo et al., "SCH Structure and Cell Search Method in E-UTRA Downlink", R1-060042, 3GPP TSG RAN WG1 L TE Ad Hoc Meeting, Jan. 23-25, 2006.

Motorola, "Cell Search and Initial Acquisition for OFDM Downlink", R1-051329, 3GPP TSG RAN1#43, Nov. 7-11, 2005.

USPTO Office Action for U.S. Appl. No. 13/052,777 dated Apr. 12, 2013.

USPTO Notice of Allowance for U.S. Appl. No. 13/183,725 dated Jan. 28, 2014.

3GPP LTE R1-050590 NTT DoCoMo, "Physical Channels and Multiplexing Evolved UTRA Downlink", Jun. 2005, 24 pages.

NTT DoCoMo, "Physical Channel Concept for Scalable Bandwidth in Evolved UTRA Downlink", R1-050592, 3GPP TSG RANWG1 LTE Ad Hoc Meeting, Jan. 20-21, 2005.

* cited by examiner

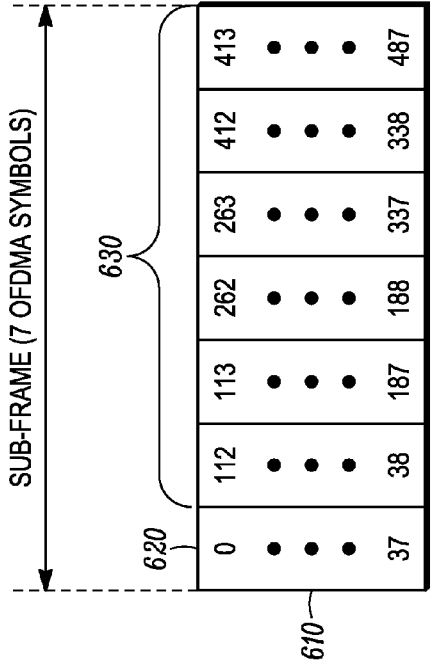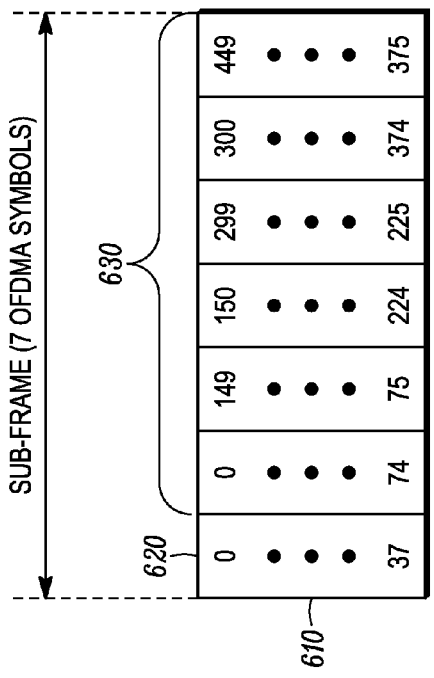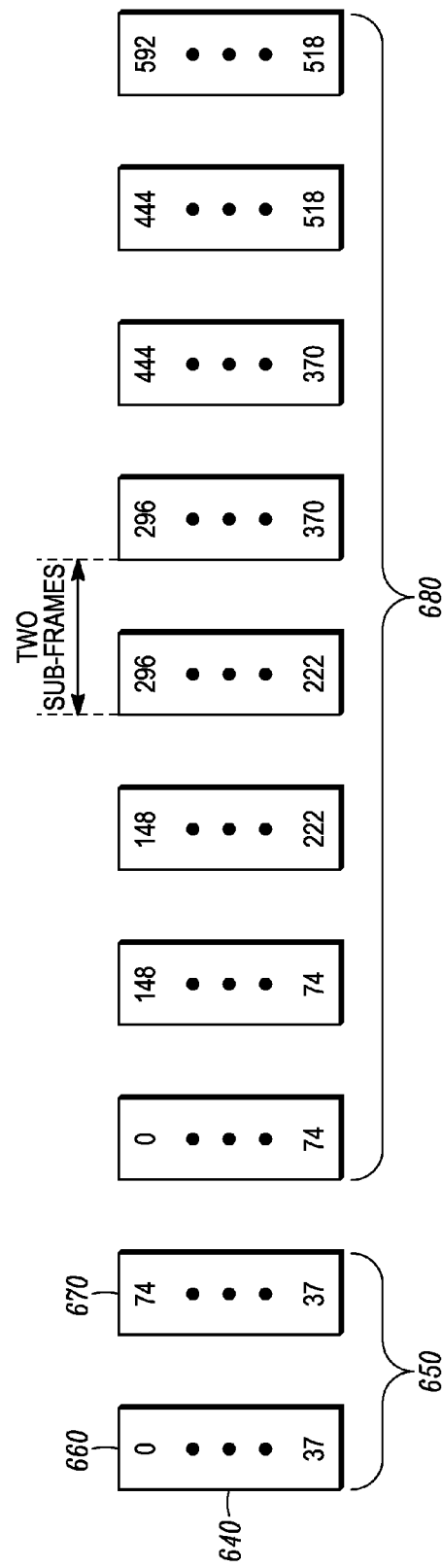

METHOD AND APPARATUS FOR INTERLEAVING SEQUENCE ELEMENTS OF AN OFDMA SYNCHRONIZATION CHANNEL

RELATED APPLICATION

This application is a continuation of co-pending, U.S. patent application Ser. No. 13/052,777, filed on Mar. 21, 2011, which is a continuation of U.S. patent application Ser. No. 11/351,275, filed on Feb. 8, 2006, now issued as U.S. Pat. No. 7,911,935.

FIELD OF THE INVENTION

The present invention generally relates to wireless communication systems, and more particularly relates to a method and apparatus in an orthogonal frequency division multiple access (OFDMA) system for interleaving sequence elements of an OFDMA synchronization channel.

BACKGROUND OF THE INVENTION

In a wireless communication system which includes a number of base stations or cells, an initial task for a wireless communication device is to recognize and acquire the signals transmitted from the cells. Another primary task is to search the cells to determine which cell is the best for establishing communication with. As more and more complex signaling systems are developed, these important tasks become more difficult and more time-consuming. Recently, orthogonal frequency division multiple access (OFDMA) signaling systems have been proposed. The OFDMA systems are scalable bandwidth systems designed to work in different bandwidths. In addition, the OFDMA systems utilize a multi-carrier modulation approach having, perhaps, hundreds of subcarriers within a narrow (e.g., 5 MHz) frequency range. While the scalability of OFDMA systems facilitates the introduction and expansion of such systems, the complexity of OFDMA systems must nevertheless allow for signal acquisition by OFDMA wireless communication devices in a timely manner for quick activation and seamless transition from cell to cell. To enable initial acquisition and cell search, a synchronization channel is provided. However, the length and complexity of the synchronization channel signal increases with the number of cells and the complexity of system design and signal propagation solutions.

Thus, what is needed is a method and apparatus for interleaving sequence elements of a synchronization channel signal for improved initial acquisition and cell search. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

FIG. 6A is a diagram of the synchronization channel sequence assignment in accordance with an embodiment of the present invention;

FIG. 6B is a diagram of the synchronization channel sequence assignment in accordance with an alternate embodiment of the present invention;

FIG. 6C is a diagram of the synchronization channel sequence assignment in accordance with yet another alternate embodiment of the present invention;

DETAILED DESCRIPTION OF THE INVENTION

In accordance with an embodiment of the present invention, a method in a wireless communication system includes the step of transmitting an orthogonal frequency domain multiple access (OFDMA) signal including a synchronization channel signal transmitted within a localized portion of a bandwidth of the OFDMA signal, the synchronization channel signal having predetermined time domain symmetry within the localized portion of bandwidth and including information for providing at least partial cell identification information. In addition, a method in a wireless communication system in accordance with an embodiment of the present invention includes the step of transmitting an OFDMA signal including a synchronization channel signal, the synchronization channel signal including a plurality of synchronization channel signal sequence elements and the OFDMA signal including a plurality of subcarriers and a plurality of OFDMA symbol periods, wherein the plurality of synchronization channel signal sequence elements are distributed among either or both of the plurality of subcarriers and a plurality of time intervals such as the plurality of OFDMA symbol periods.

Also, in accordance with an embodiment of the present invention, a method for receiving OFDMA signals includes the steps of isolating a portion of a bandwidth of the OFDMA signals which includes a synchronization channel signal, detecting a position of the synchronization channel within the portion of the bandwidth of the OFDMA signals, and decoding the synchronization channel signal to derive at least partial cell identification information therefrom.

Figure 1:
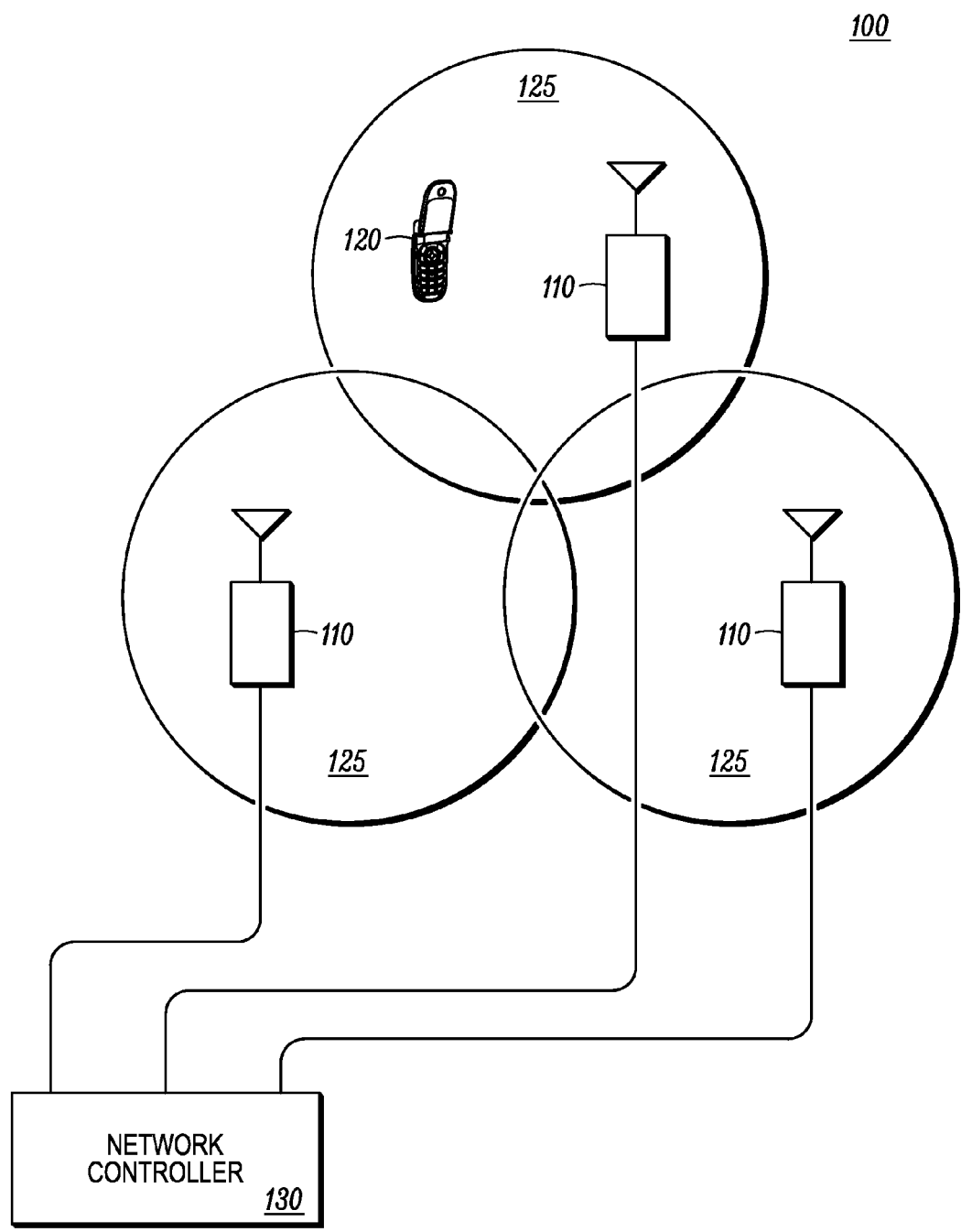
FIG. 1 is a diagram of a wireless communication system in accordance with an embodiment of the present invention.

Referring to FIG. 1, an orthogonal frequency division multiple access (OFDMA) wireless communication system 100 in accordance with an embodiment of the present invention includes a plurality of base stations 110 and a wireless communication device 120. The plurality of base stations 110 communicate with the wireless communication device 120 via OFDMA radio frequency (RF) signals on a plurality of subcarriers for wireless communications. Associated with each of the plurality of base stations 110 is a coverage area 125 wherein the wireless communication device 120 can receive OFDMA signals from and transmit signals to one or more of the plurality of base stations 110. The wireless communication device 120 will typically receive signaling and other messaging from a base station having the strongest signal strength, or otherwise some preferable signal characteristics such that the particular base station 110 is the "best server" to the particular wireless communication device 120. The plurality of base stations 110 are coupled to a network system controller 130 for centralized control of the OFDMA wireless communication system.

An OFDMA wireless communication system is a multicarrier modulation scheme which has been proposed as a next generation solution for present wide-area code division multiple access (WCDMA) wireless communication systems. OFDMA is a more general case of an orthogonal frequency domain multiplexing (OFDM) system wherein data for different users can be transmitted simultaneously on different subcarriers. OFDMA wireless communication systems have a large number of subcarriers, wherein a subcarrier only occupies a small fraction of the OFDMA channel bandwidth (e.g., fifteen kilohertz (kHz) per subcarrier in a five megahertz (MHz) OFDMA channel bandwidth). Thus, for example, in a five MHz range, there could be approximately three hundred subcarriers. OFDMA system design provides a highly scalable, multiple system bandwidth solution because, as OFDMA systems are designed to work in different bandwidths, more subcarriers can be added as needed. In addition, the OFDMA system design being contemplated for next-generation evolution of the WCDMA system supports both a synchronized system and an unsynchronized system and allows for a large number base station identifiers (cell index) and OFDMA symbol structures with both short and long cyclic prefix lengths.

An OFDMA system in accordance with the embodiment of the present invention defines a synchronization channel which significantly reduces the time required for a wireless communication device 120 to synchronize to the OFDMA system by acquiring the OFDMA system timing simultaneous with identifying the strongest base station 110, or "best server" as described above, for establishing communication therewith (i.e., the initial acquisition and cell search time). The OFDMA initial acquisition and cell search process should detect an OFDMA symbol timing, a frame boundary and a frequency error as well as detect cell specific information such as an identification of the base station 110 and, if necessary, other cell specific information such as the system bandwidth, the number of transmission antennas on the base station 110 or a cyclic prefix length. The synchronization signal in accordance with the embodiment of the present invention includes at least partial cell (i.e., base station) identification information. The cell identification information of the synchronization channel could be partial cell identification information identifying a group of individual base stations 110 (e.g., cell group identification information) or could be full cell identification information identifying a unique base station 110, and may further provide sector identification information in embodiments in which base stations 110 are partitioned by antenna coverage patterns and resource allocation into multiple sectors.

Figure 2:
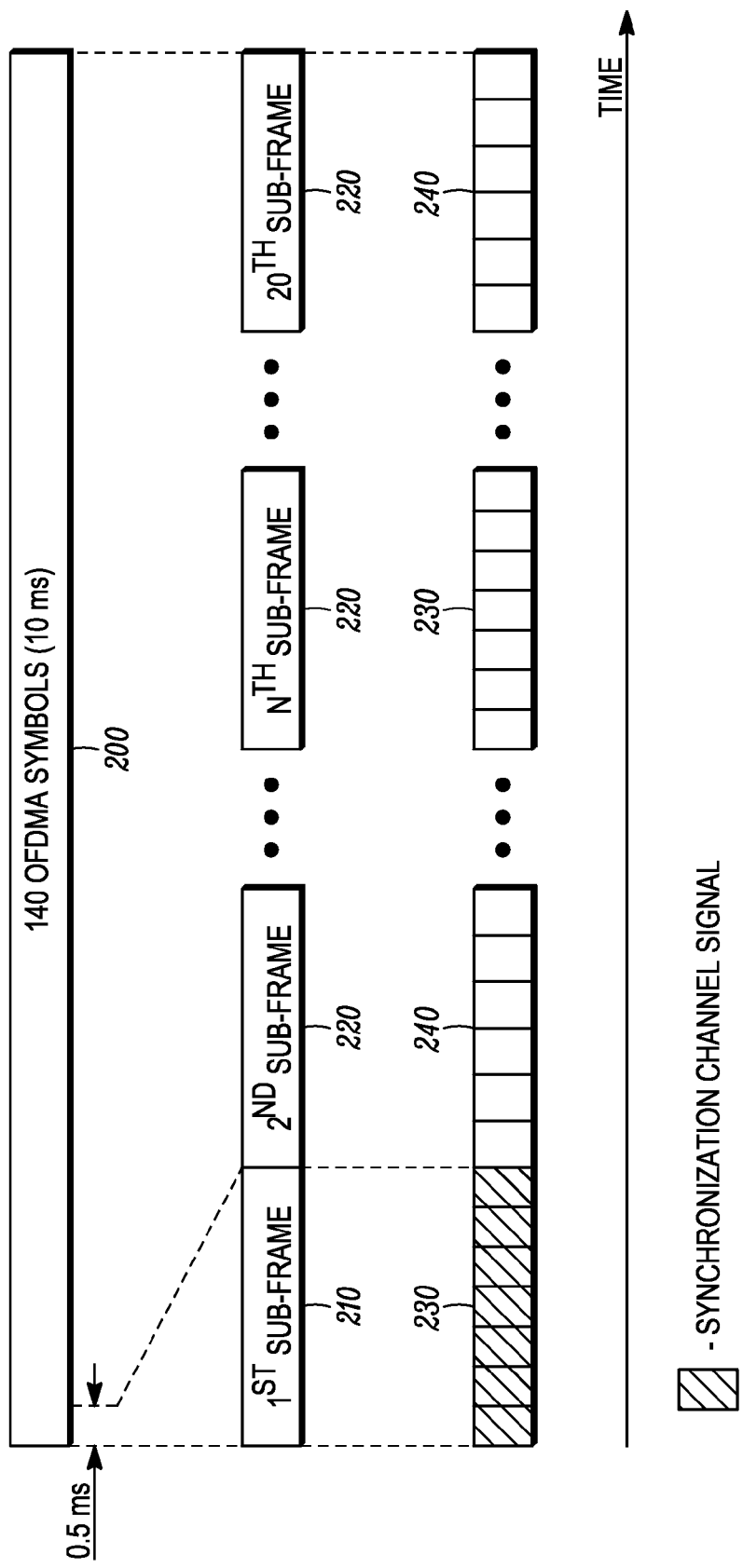
FIG. 2 is a diagram of a frame structure of an orthogonal frequency domain multiple access (OFDMA) signal in accordance with an embodiment of the present invention.

Referring to FIG. 2, an exemplary OFDMA frame structure depicts a single OFDMA frame 200 of ten milliseconds transmission time comprising one hundred and forty OFDMA symbols. The frame 200 includes twenty sub-frames 210, 220, where the first sub-frame 210 is the synchronization channel occupying a seven OFDMA symbol sub-frame 210 where the seven OFDMA symbols 230 form a short cyclic prefix (CP) sub-frame. The remaining nineteen sub-frames 240 can either be a long CP sub-frame having six OFDMA symbols 240 or a short CP sub-frame having seven OFDMA symbols 230. While the example in FIG. 2 depicts the synchronization channel in a first sub-frame 210 having a short cyclic prefix, location of the synchronization channel and the cyclic prefix thereof can be defined in any manner or location to accommodate the OFDMA system design. By locating the synchronization channel in the first sub-frame 230 (as shown) or the last sub-frame in accordance with another embodiment of the present invention, the frame boundary is defined by the synchronization channel.

Figure 3:
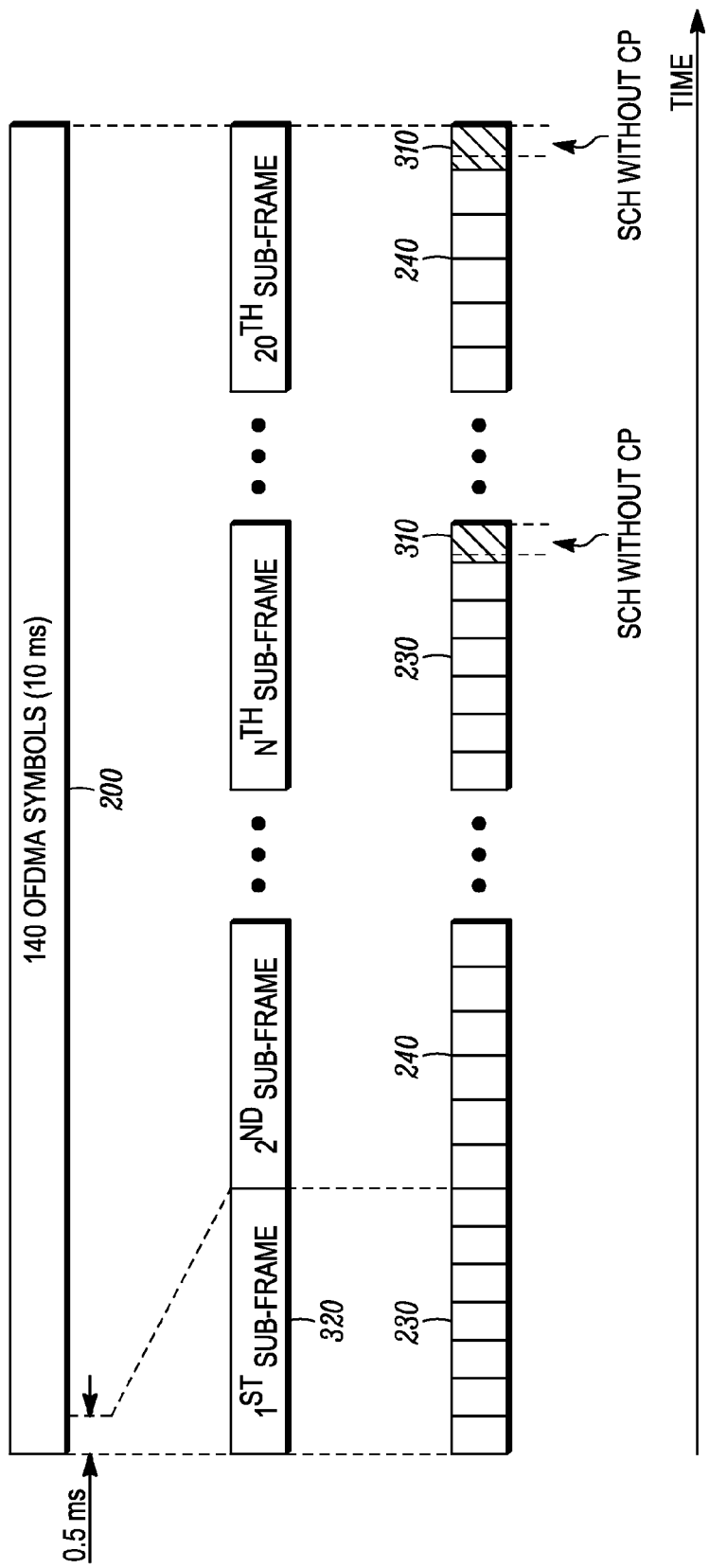
FIG. 3 is a diagram of a frame structure of an OFDMA signal in accordance with an alternate embodiment of the present invention.

Referring to FIG. 3, an OFDMA frame structure in accordance with an alternate embodiment of the present invention is depicted. In accordance with this alternate embodiment, the synchronization channel 310 is assigned to the end of more than one of the twenty sub-frames 320 in order to detect the synchronization channel 310 regardless of the CP length. The synchronization channel 310 is transmitted every N sub-frame 320 in order to reduce the initial acquisition and cell search time and memory size of initial acquisition in unsynchronized OFMDA systems, where N is an aliquot of twenty. It will be recognized by those skilled in the art that the system parameters of the sub-frames, the length and number of symbols of the OFDMA system frame and other frame structure parameters may be modified in accordance with a plurality of system designs, and the frame structure of an OFDMA system in accordance with the present invention is not restricted to the embodiments of FIG. 2 or FIG. 3.

Figure 4:
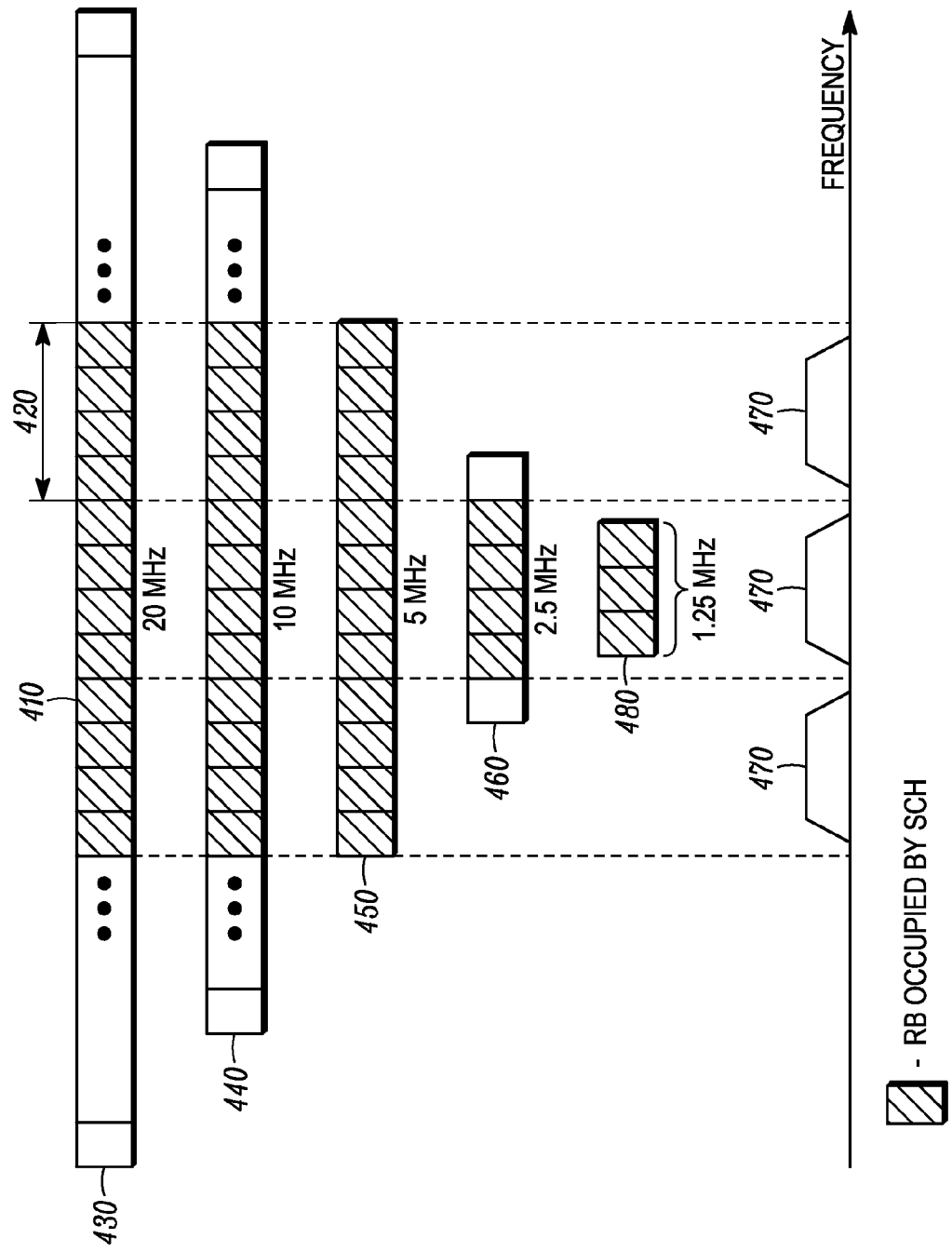
FIG. 4 is a diagram of the signal channel bandwidth occupation in accordance with an embodiment of the present invention.

The synchronization channel, in accordance with an embodiment of the present invention, is transmitted within a localized portion of the bandwidth of the OFDMA signal, e.g., the center 1.25 MHz bandwidth of the OFDMA signal, regardless of the system bandwidth, thereby reducing the initial acquisition and cell search time while preserving the scalability of the OFDMA wireless communication system. Referring to FIG. 4, predetermined resource blocks 410 are predefined frequency bands. While it is recognized that any frequency band can be defined for the resource blocks, in accordance with one embodiment of the present invention, the resource block (RB) size is 0.375 MHz and the synchronization channel 420 is generally defined to be 1.5 MHz, thus occupying four resource blocks 410. Subcarrier symbols in system bandwidth except for the center resource blocks 410 occupied by the synchronization channel 420 are utilized for other channels. In another embodiment, the bandwidth of the synchronization channel is related to the OFDMA signal bandwidth. Some examples of this are OFDMA system bandwidths 430, 440, 450, 460, 480.

In a twenty megahertz OFDMA system 430 (having forty-eight resource blocks 410) and a ten megahertz OFDMA system 440 (having twenty-four resource blocks 410), the synchronization channel 420 uses the central twelve resource blocks 410. In a five megahertz OFDMA system 450 (having twelve resource blocks 410), the synchronization channel 420 uses all twelve resource blocks 410. In a 2.5 MHz OFDMA system 460 (having six resource blocks 410), the synchronization channel 420 uses only the central four resource blocks 410. Utilizing the symmetry of the synchronization channel 420, the spectrum 470 of the synchronization channel 420 covers the central portion of the four resource locks 410 of the synchronization channel 420. Unused subcarriers on either side of the synchronization channel spectrum 470 can be used for guard bands or data (e.g., low rate channels such as acknowledgements of received uplink traffic, or other data streams/channels).

In another embodiment where the bandwidth of the synchronization channel is related to the OFDMA signal bandwidth, the synchronization channel signal may be repeated in the frequency dimension to further improve performance. For example, the synchronization channel signal information may be contained in the central four resource blocks. Then, each additional set of four resource blocks that are within the synchronization channel bandwidth may contain another transmission or repetition of the synchronization channel signal contained in the central four resource blocks.

In addition to the partial or full cell identification information or the repetition or transmission of the synchronization channel signal, for five megahertz or larger bandwidth OFDMA systems, the synchronization channel 420 can use frequency bands other than the center four resource blocks to enhance cell search performance. For example, all or a portion of additional cell specific information such as frequency reference information, transmission antenna information, pilot stream information or cyclic prefix (CP) length information could be included in the synchronization channel 420 information. In addition, the OFDMA system could be designed to redundantly transmit the synchronization channel on two or more of a plurality of subcarriers within the portion of bandwidth occupied by the synchronization channel 420.

For the case where the OFDMA system bandwidth is 1.25 MHz 480, only three resource blocks 410 can be accommodated and the synchronization channel 420 uses all three resource blocks 410. While a number of variations of OFDMA system bandwidth have been shown, other structures are possible wherein the synchronization channel is transmitted in a localized portion of the OFDMA system bandwidth.

Figure 5:
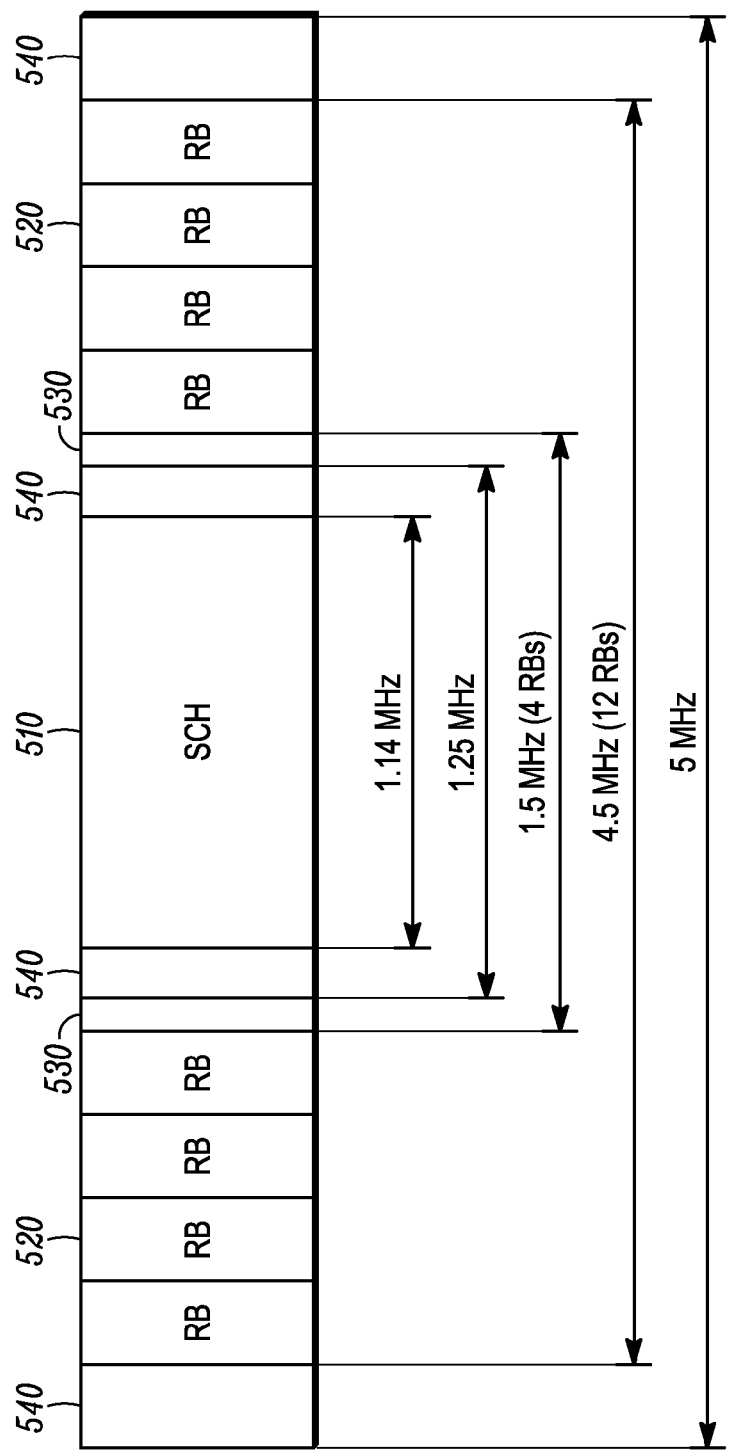
FIG. 5 is a diagram of the resource block mapping of the synchronization channel in accordance with an embodiment of the present invention.

FIG. 5 depicts a five megahertz OFDMA communication system signal bandwidth where the localized synchronization channel bandwidth 510 is located in the center 1.25 MHz of the five megahertz bandwidth and within, but smaller than a bandwidth spanned by a multiple number of resource blocks 520. In this instance, the synchronization channel bandwidth 510 does not cover a multiple of the resource block size 520. In accordance with the embodiment of the present invention, a data signal 530 is transmitted simultaneously with the synchronization channel in a portion of the bandwidth spanned by an integer number of resource blocks 520 that is not utilized by the synchronization channel 510. For improved detection of the data signal 530, it may be separated from the synchronization channel by bandwidths where no information is transmitted called guard bands 540.

The synchronization channel signal is a sequence divided into synchronization channel signal sequence elements. An example of a preferred sequence type in accordance with the present invention is a generalized chirp like (GCL) sequence. For example, a length-$N_G$ GCL sequence of "index" u which is defined as $$s_k = a_k b, k=0,\ldots,N_G-1 \quad (1)$$

where b is a complex scalar of unit amplitude and $$a_k = \exp\left(-j2\pi u \frac{k(k+1)/2 + qk}{N_G}\right),$$

$k=0,1,2,\ldots,N_G-1$ (any integer $q$ and $1 \le u \le N_G-1$) (2)

and $N_G$ is a prime number (i.e., $N_G = N_G \times 1$) is particularly suitable for a sequence divided into synchronization channel signal sequence elements in accordance with the present invention. Where $N_G$ is a prime number, the cross-correlation between any two sequences of distinct "class" is optimal and there will $N_G-1$ unique sequences in the set that can be used as unique group identifiers or unique cell identification information. The GCL sequence can be represented more simply and compactly by choosing b=1 and q=0.

Additional examples of sequence types that can be used for the synchronization channel sequence elements in accordance with the present invention may include a Pseudo-random Noise (PN) sequence or a maximal length binary sequence. When a structured sequence with limited choices of sequence length (such as GCL or maximal-length binary) is used, the number of elements in the original sequence may not match size of the synchronization channel. In this case, the sequence may be modified to fit within the resources available for the synchronization channel signal sequence (e.g., by truncation or cyclic extension thereof). In accordance with another aspect of the embodiment of the present invention, the synchronization signal includes a plurality of synchronization channel signal sequence elements that are distributed over the OFDMA signal subcarriers and/or the OFDMA symbol periods as determined by the OFDMA system design or by signal propagation conditions that the system is expected to operate in.

FIG. 6, comprising FIGS. 6A, 6B and 6C, depicts frame structures for synchronization channel sequence element assignment in accordance with the present invention wherein the synchronization channel sequence elements are distributed over frequency (the subcarriers) first and then over time. The present invention, however, is not limited to this synchronization channel sequence element assignment scheme and may alternatively distribute the synchronization channel sequence elements over time first and then frequency if, for example, the system design allows changes in time faster than in frequency. Referring to FIG. 6A, the synchronization channel signal is transmitted over a sub-frame 610 with a frame structure of seven OFDMA symbols, wherein the synchronization channel sequence elements are transmitted on a plurality of subcarriers in adjacent or proximal OFDMA symbol periods. While not shown, in some embodiments, pilot symbols or other symbols such as control symbols may occupy part or all of one or more of the OFDMA symbol periods in sub-frame 610, such that the time spacing between some of the aforementioned proximal OFDMA symbol periods may be more than one OFDMA symbol period.

Figure 7:
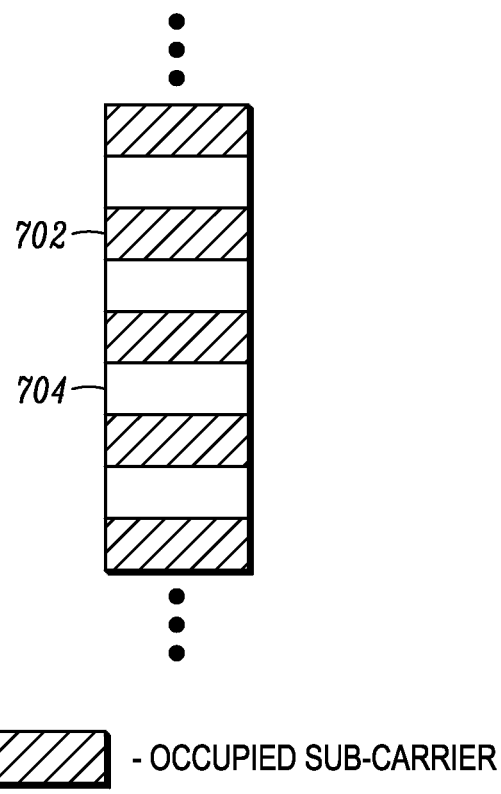
FIG. 7 is a diagram of the sub-carrier mapping of the synchronization channel signal in accordance with the embodiment of the present invention.

In accordance with the present invention, a first OFDMA symbol period 620 includes a common GCL sequence of modulation symbols or zeros forming thirty-eight sequence elements mapped onto thirty-eight subcarriers, the GCL sequence in the first OFDMA symbol period 620 being common for all of the base stations 110 in the OFDMA wireless communication system 100. By using every other sub-carrier (e.g., even numbered subcarriers) for this common GCL sequence 620, the waveform can have a predetermined time domain symmetry. This common GCL sequence 620 may be present in all synchronization channel transmissions and may be located in the first OFDMA symbol period of the subframe 610, thereby utilized as a frame boundary indicator. Referring to FIG. 7, an example of the sub-carrier mapping of the synchronization channel signal in the first OFDMA symbol period 620 is shown where modulated symbols are mapped to every other subcarrier (the thirty-eight occupied subcarriers 702) with the intervening subcarriers 704 having zeros or null sets mapped thereto. The modulation symbols are mapped to even numbered subcarriers in order to create or define the symmetry of the waveform in the time domain (i.e., the predetermined time domain symmetry of the synchronization channel signal waveform). This symmetry characteristic can be utilized for coarse OFDMA symbol timing detection and frequency error detection.

Referring back to FIG. 6A, the subsequent six OFDMA symbol periods 630 include the GCL sequence unique to a group of cells or base stations, or unique to the cell or base station 110 (depending on the embodiment) as a plurality of synchronization channel sequence elements mapped onto a plurality of subcarriers, each OFDMA symbol period having all seventy-five subcarriers used for the GCL synchronization channel sequence elements and filling the six OFDMA symbol periods 630 in a "zig-zag" fashion. For example, FIG. 6A depicts the synchronization channel signal GCL sequence including 449 synchronization channel sequence elements. The second OFDMA symbol period 630 is filled with synchronization channel signal sequence elements (phases) 0 to 74 ordered from top to bottom. The third OFDMA symbol period 630 is filled with synchronization channel signal sequence elements 75 to 149 ordered from bottom to top, but in an alternate embodiment could also be ordered from top to bottom. In a like manner, the remaining OFDMA symbol periods 630 are filled with the remaining synchronization channel signal sequence elements, with the sixth OFDMA symbol being filled with synchronization channel signal sequence elements (phases) 375 to 449 ordered from bottom to top. Instead of filling the OFDMA symbol periods of the synchronization channel in a "zig-zag" fashion, the OFDMA symbol periods 630 could all be filled from top to bottom or vice versa in accordance with the OFDMA system design, the sequence type and/or the processing necessary to combine the synchronization channel sequence elements. In addition, instead of filling the synchronization channel in a frequency-first fashion, the OFDMA symbol periods 630 could be filled in a time-first fashion (e.g., from left to right on each subcarrier, right to left on each subcarrier, or left to right on some subcarriers and right to left on other subcarriers). Or, instead of the above described filling methods, any arbitrary two-dimensional filling pattern could be used.

Referring to FIG. 6B, a synchronization channel signal unique to a cell or base station 110 or a group of cells (e.g., a GCL sequence common to multiple cells) is also transmitted over a sub-frame 610 with a frame structure of seven OFDMA symbols, wherein the synchronization channel sequence elements are transmitted on a plurality of subcarriers in adjacent or proximal OFDMA symbol periods. In accordance with this embodiment of the present invention, the first OFDMA symbol period 620 includes zeros mapped onto 37 subcarriers and elements of a cell-specific or group-specific GCL sequence forming thirty-eight sequence elements mapped onto thirty-eight subcarriers, for one or a group of the base stations 110 in the OFDMA wireless communication system 100. The subsequent six OFDMA symbol periods 630 include additional elements of the cell-specific GCL sequence mapped onto a plurality of subcarriers, each OFDMA symbol period having all seventy-five subcarriers (phases), filling the six OFDMA symbol periods 630 in the "zig-zag" fashion. FIG. 6B depicts the synchronization channel signal GCL sequence including 487 synchronization channel sequence elements. The second OFDMA symbol period 630 is filled with synchronization channel signal sequence elements (phases) 38 to 112 ordered from bottom to top. The third OFDMA symbol period 630 is filled with synchronization channel signal sequence elements 113 to 187 ordered from top to bottom. In a like manner, the remaining OFDMA symbol periods 630 are filled with the remaining synchronization channel signal sequence elements, with the sixth OFDMA symbol being filled with synchronization channel signal sequence elements (phases) 413 to 487 ordered from top to bottom.

Referring to FIG. 6C, another alternate structure of a synchronization channel sequence assignment is shown. In accordance with the present invention, the synchronization channel sequence elements may be distributed over the OFDMA symbol periods (as shown in FIG. 6A) or may be distributed over more than one of the plurality of subcarriers of the OFDMA signal, or a combination of both distributions. In the alternate embodiment of FIG. 6C, there are ten synchronization channel symbol periods in the frame structure 640. In order to accommodate a longer common GCL sequence (e.g., longer than thirty-eight sequence elements), a first portion 650 of the synchronization channel includes two OFDMA symbol periods 660, 670. The first OFDMA symbol period 660 may be used as a frame boundary indicator. In accordance with the alternate embodiment of the present invention, the synchronization channel sequence elements are mapped to every second sub-frame such that the first synchronization channels 650, which includes seventy-five subcarriers, is mapped to the first OFDMA symbol period 660 and the second OFDMA symbol period 670. Each of the OFDMA symbol periods 660, 670 with the common GCL sequence includes thirty-eight sub-carriers, where the use of even numbered sub-carriers maintains the predetermined time domain symmetry of the synchronization channel as shown in FIG. 7 and discussed above.

Channel conditions could change during a gap between the sub-frames. To accommodate the differential processing of the synchronization channel sequence elements, the subsequent OFDMA symbol period 670 may repeat, as shown in FIG. 6C, the last sequence element (e.g., phase 37) of the previous OFDMA symbol period 620. Following the first synchronization channels 660, the second synchronization channels 680 include eight OFDMA symbol periods having 592 synchronization channel sequence elements mapped to seventy-five subcarriers for each OFDMA symbol period. The eight OFDMA symbol periods 680 for the second synchronization channels use every second sub-frame and are filled in a "zig-zag" fashion (as shown) or any arbitrary two-dimensional filling pattern as discussed above, repeating the last sequence element of an OFDMA symbol period as the first sequence element of the next OFDMA symbol period. Accordingly, the third OFDMA symbol period is filled with synchronization channel signal sequence elements (phases) 0 to 74 ordered from top to bottom. The fourth OFDMA symbol period is filled with synchronization channel signal sequence elements 74 to 148 ordered from bottom to top.

Within each synchronization channel sequence element, GCL sequence elements may preferably be employed such that differential processing of the GCL sequence elements will provide determination of the sequence index. GCL sequence elements have 0 dB peak-to-average power ratio (PAPR) and optimal cross correlation properties. If a GCL sequence is applied in the frequency domain on all subcarriers, the properties still hold for the corresponding time-domain waveform since the Fourier transform of a GCL sequence is also a GCL sequence. In addition, if a GCL sequence is passed through a differential demodulator, the resulting output sequence is a complex exponential with a frequency that corresponds to the original sequence index. Thus, using GCL sequence elements, each synchronization channel signal sequence element will have sequence index properties for inherently determining the sequence index thereof. As mentioned earlier, other types of sequences could also be used, but it is preferred that the sequence have properties that enable sequence index detection based on the differential demodulation of the sequence. One example of a sequence other than GCL that has such properties is a maximal-length binary sequence, since a differential demodulation of a maximal-length binary sequence produces a cyclically shifted version of the same sequence with a predetermined shift value. Thus, with a maximal-length binary sequence, each cell ID can be associated with a particular cyclic shift value of the sequence, and the cell ID can be recovered based on differential processing.

Figure 8:
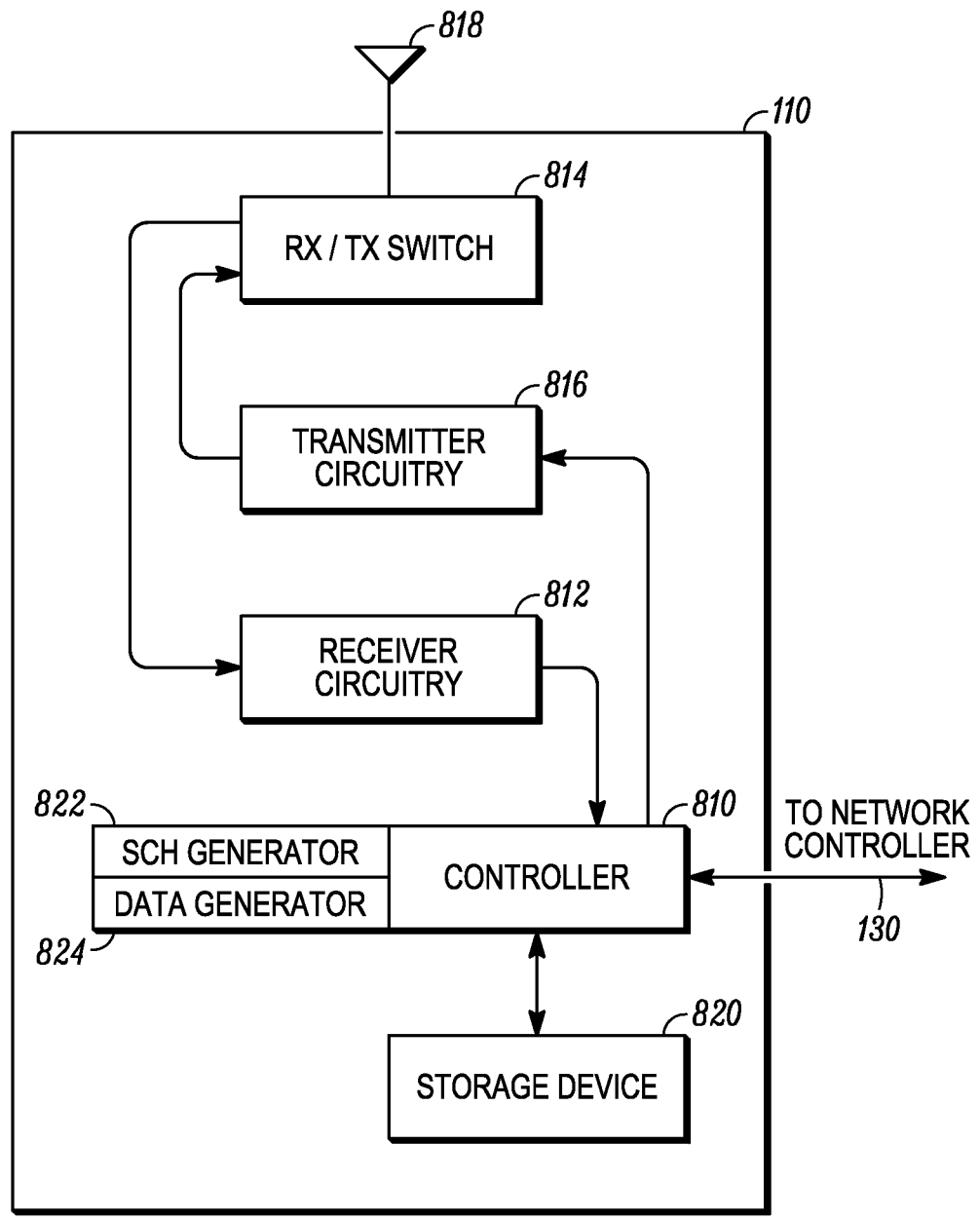
FIG. 8 is a block diagram of a base station of the communication system of FIG. 1 in accordance with the embodiment of the present invention.

Referring to FIG. 8, a block diagram of the OFDMA base station 110 includes a base station controller 810 coupled to the network controller 130 and controlling the operation of the base station 110. The controller is coupled to receiver circuitry 812 and transmitter circuitry 816, and may further include a receiver/transmitter switch 814 for controlling the transmission and reception of the OFDMA signals over the antenna 818 if communications over the antenna 818 are duplexed. OFDMA signals received by the receiver circuitry 812 are demodulated thereby and provided to the controller 810 for decoding thereof. In addition, the controller 810 provides signals to the transmitter circuitry 816 for modulation thereby and transmission therefrom. While a single antenna 818 is shown, it is to be understood that base stations 110 may be, and are typically, configured into sectors and may employ multiple antennas for receive diversity, and/or transmission beamforming applications, space time coding, multiple input multiple output (MIMO), or other system design transmission signaling schemes. Therefore, many transmit and receive antenna configuration are possible in various embodiments and FIG. 8 is not intended to be a complete schematic representation of such antenna configurations but rather to exemplify components helpful toward understanding the embodiments disclosed herein. With multiple antennas, it is useful to convey the number of antennas to the wireless communication devices 120 to know how many pilot streams to search for during initial acquisition and cell search. Thus, in accordance with an embodiment of the present invention, the additional cell specific information that may be transmitted as part of the synchronization channel signal may include the number of antennas of the base station 110 or pilot stream information. The controller 810 is coupled to a storage device 820 which stores information for the operation of the base station 110 such as cell identification information and other cell specific information such as frequency reference information, transmission antenna information (such as the number of antennas), pilot stream information and cyclic prefix length information.

In accordance with the present invention, the controller 810 includes a synchronization channel generator 822 for generating a synchronization channel signal having time domain symmetry within a portion of the OFDMA signal bandwidth and comprising at least partial cell identification information, the synchronization channel generator 822 providing the synchronization channel signal to the transmitter circuitry 816 for transmission therefrom. Sometimes the synchronization channel generator 822 generates a synchronization channel signal including at least a portion of additional cell specific information. A data signal generator 824 generates an OFDMA data signal for providing to the transmitter circuitry 816 for transmission therefrom and, in accordance with one aspect of the present invention wherein the bandwidth is divided into a set of resource blocks, the data signal is transmitted simultaneously with the synchronization channel signal on a portion of a bandwidth spanned by an integer number of predetermined resource blocks when the synchronization channel signal spans a bandwidth smaller than a bandwidth spanned by the integer number of predetermined resource blocks. Data could be voice or MBMS transmissions that are generated by a calling wireless communication device 120 or by a content provider and may be multiplexed onto the subcarriers and interleaved at the base station 110 or multiplexing may be performed by the network controller 130. The synchronization channel generator 822 defines the time domain symmetry of the synchronization channel signal in one embodiment by mapping modulation signals and zeros onto a plurality of subcarriers thereof.

Figure 9:
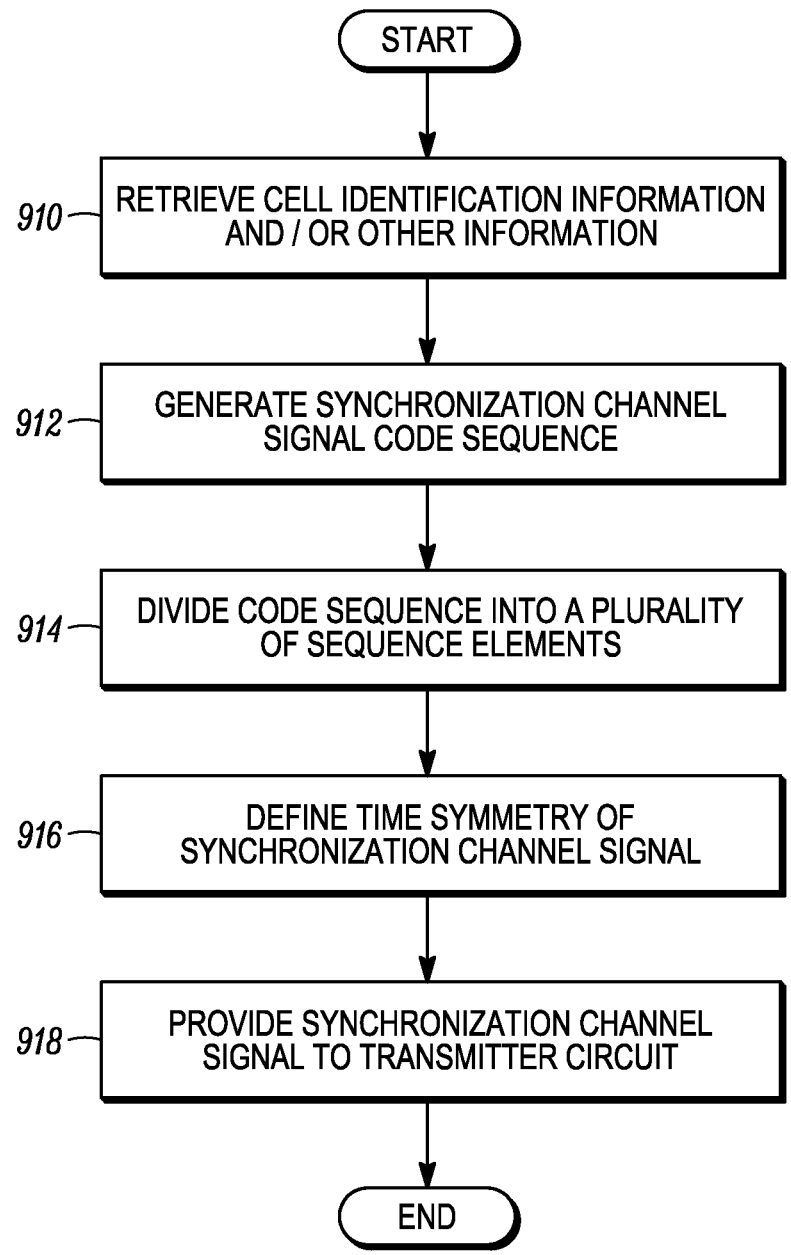
FIG. 9 is a flowchart of the base station synchronization channel signaling of the base station of FIG. 8 in accordance with the embodiment of the present invention.

Referring to FIG. 9, operation of the synchronization channel generator 822 in accordance with the embodiment of the present invention begins by retrieving information 910 from the storage device 820. At a minimum, this information includes cell identification information uniquely identifying the base station 110 or at least partial cell identification information, such as group cell identification information. Additional cell specific information, as discussed above, could also be retrieved 910.

Next, the synchronization channel signal is generated 912 by encoding the cell identification information. The synchronization channel signal is parsed into a plurality of synchronization channel sequence elements 914. The predetermined time domain symmetry of the synchronization channel signal is then defined 916. In accordance with the present invention, step 916 would include providing an even number of subcarriers in a resource block and may include mapping the generated synchronization channel signal as modulation symbols and zeros onto a plurality of subcarriers where the modulation symbols are mapped to every nth subcarrier of at least a portion of the subcarriers utilized for the synchronization channel signal, where n is an integer greater than or equal to two.

After the time domain symmetry is defined 916, the synchronization channel signal is provided 918 to the transmitter circuitry 816 for transmission from the base station 110. The synchronization channel signal is periodically transmitted from the base station 110 to enable initial acquisition and cell search. Thus, the synchronization channel signal may, in addition to the foregoing be provided to the transmitter circuitry 816 redundantly either in time or across subcarriers for improved initial acquisition and cell search. The redundancy and the content of the synchronization channel signal can be revised and/or redefined based upon the bandwidth of the OFDMA signal (i.e., in response to the scaling of the OFDMA signal bandwidth).

Figure 10:
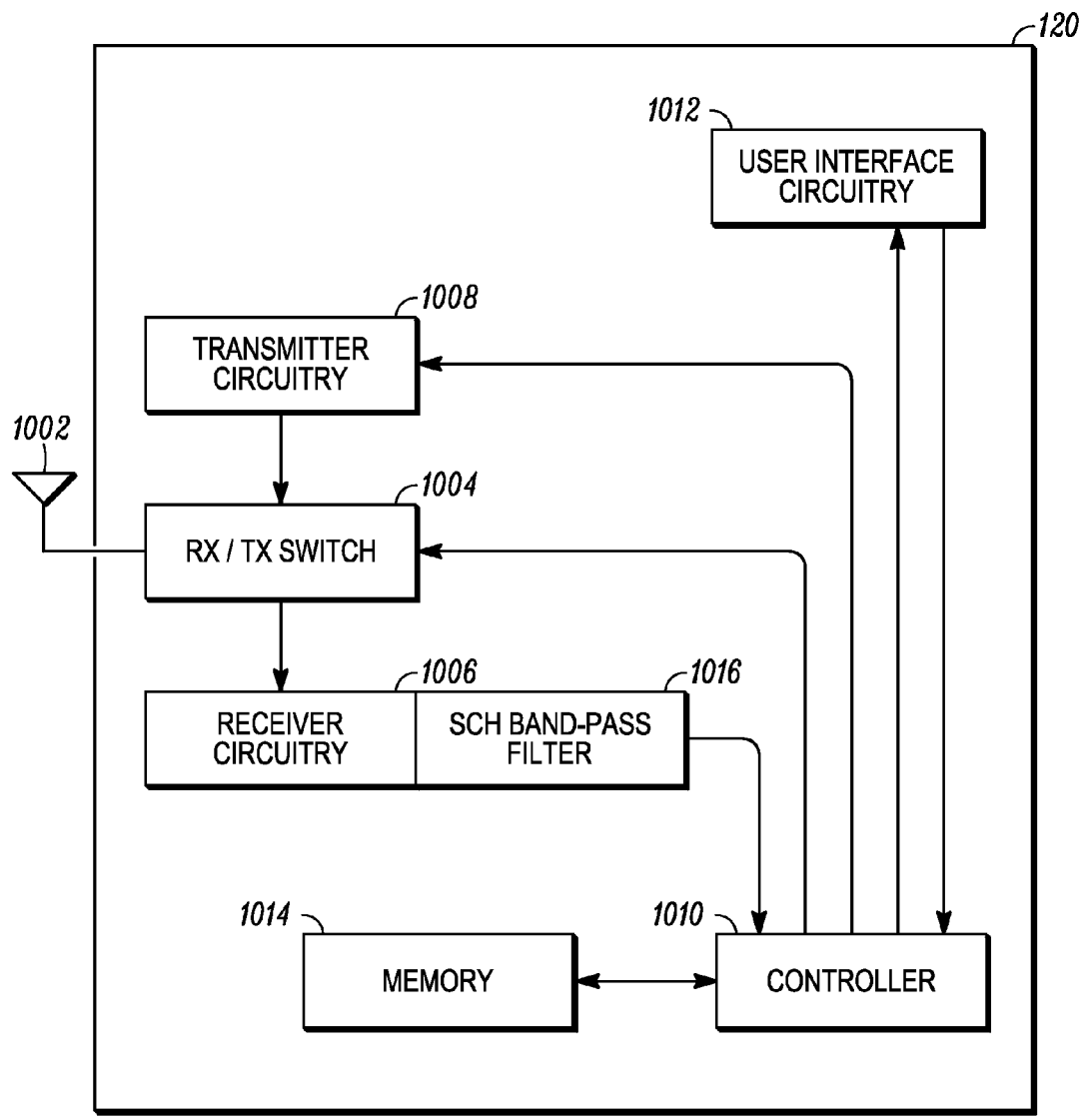
FIG. 10 is a block diagram of a wireless communication device of the communication system of FIG. 1 in accordance with the embodiment of the present invention.

Referring to FIG. 10, a wireless communication device 120 in accordance with the embodiment of the present invention is shown. The wireless communication device 120 includes an antenna 1002 for receiving and transmitting radio frequency (RF) signals. A receive/transmit switch 1004 selectively couples the antenna 1002 to receiver circuitry 1006 and transmitter circuitry 1008 in a manner familiar to those skilled in the art. The receiver circuitry 1006 demodulates and decodes the RF signals to derive information therefrom and is coupled to a controller 1010 for providing the decoded information thereto for utilization thereby in accordance with the function(s) of the wireless communication device 120. The controller 1010 also provides information to the transmitter circuitry 1008 for encoding and modulating information into RF signals for transmission from the antenna 1002. While a single antenna 1002 is depicted, those skilled in the art will recognize that diversity antennas could be used with diversity receivers for improved signal reception.

The controller 1010 is coupled to user interface circuitry 1012 including, for example, a display for presenting video output to a user, a speaker for providing audio output to the user, a microphone for receiving voice input, and user controls, such as a keypad, for receiving user input thereby. The controller 1010 is further coupled to a nonvolatile memory device 1014 for storing information therein and for retrieving and utilizing information therefrom.

In accordance with the embodiment of the present invention, the receiver circuitry 1006 includes a synchronization channel signal filter device 1016 for isolating a portion of the OFDMA signal bandwidth which includes the synchronization channel signal. The synchronization channel signal filter device 1016 could be a bandpass filter or any other device or process for filtering the OFDMA signal to isolate a localized portion of the OFDMA signal bandwidth. For example, a fast Fourier transform (FFT) could be utilized to isolate the localized portion of the OFDMA signal bandwidth during processing instead of a hardware filter. Once isolated, the signal is provided to the controller for initial acquisition and cell search processing.

Figure 11:
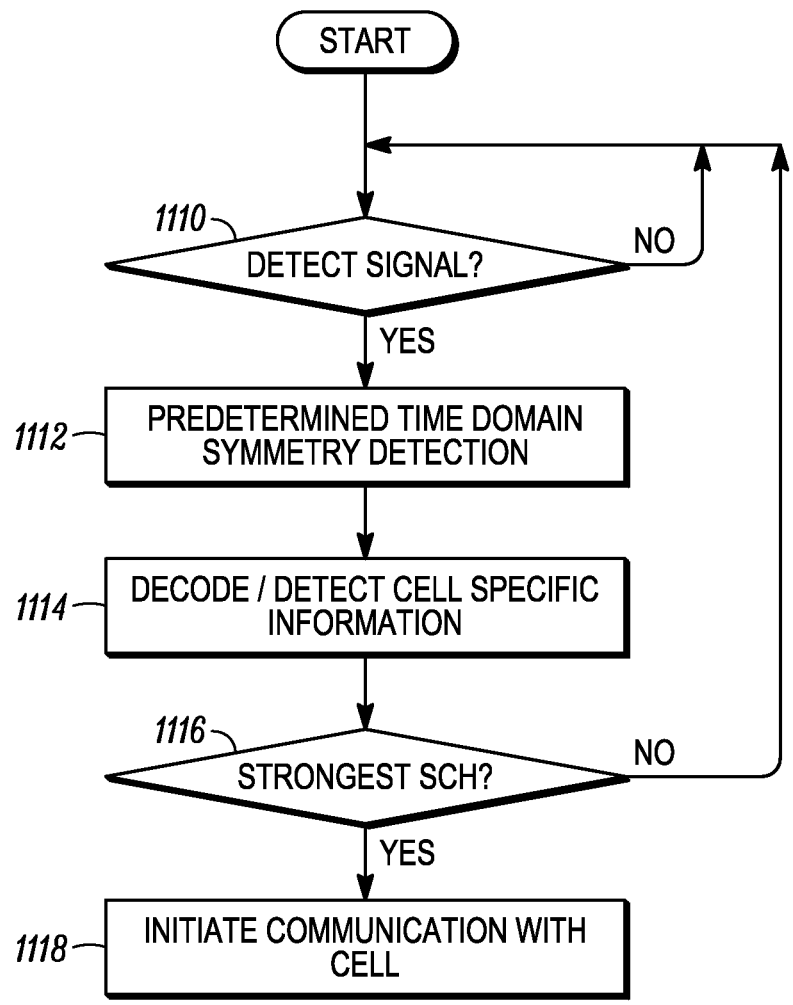
FIG. 11 is a flowchart of the initial activation and cell search of the wireless communication device of FIG. 10 in accordance with the embodiment of the present invention.

Referring to FIG. 11, the initial signal acquisition and cell search process begins by examining the signal filtered by the filter 1016 to determine if there is any signal 1110. When a signal is detected 1110, the initial acquisition and cell search method is performed in accordance with the present invention. First, the predetermined time domain symmetry of the synchronization channel signal is utilized to perform coarse OFDMA symbol timing detection and fractional frequency offset detection 1112. This step 1112 could be performed by differential correlation of the received synchronization channel signal being calculated in the time domain or by correlation calculation with known synchronization channel signal sequence elements in the time domain.

Generalized chirp like (GCL) sequences are preferably suited to differential processing in accordance with the embodiment of the present invention. However, as mentioned previously, the present invention can use other sequence types. The time domain waveforms of the GCL-modulated OFDM signals have low PAPR. In addition, because of the use of different indices of the GCL sequences, any pair of the sequence elements will have low cross correlation at all time lags, which improves the code detection and CIR estimation. Also, GCL sequences have constant amplitude, and the $N_G$-point DFT of GCL sequences also have constant amplitude. GCL sequences of any length additionally have an "ideal" cyclic autocorrelation (i.e., the correlation with the circularly shifted version of itself is a delta function). And, the absolute value of the cyclic cross-correlation function between any two GCL sequences is constant and equal to $1/\sqrt{N_G}$, when $|u_1-u_2|$, $u_1$, and $u_2$ are all relatively prime to $N_G$ (a condition that can be easily guaranteed if $N_G$ is a prime number).

The cross-correlation $1/\sqrt{N_G}$ at all lags actually achieves the minimum cross-correlation value for any two sequence elements that have the ideal autocorrelation property (meaning that the theoretical minimum of the maximum value of the cross-correlation over all lags is achieved). The minimum is achieved when the cross correlations at all lags is equal to $1/\sqrt{N_G}$. The cross correlation property allows the impact of an interfering signal be evenly spread in the time domain after correlating the received signal with the desired sequence in the time domain. Hence, the cell-search symbol can also be used to perform or assist coherent channel estimation at the wireless device even before the broadcast pilot symbols are processed. Compared with BPSK or even QPSK preambles, the complex-valued GCL sequences can be systematically constructed with guaranteed good PAPR and good correlation.

Differential processing of the GCL sequence elements enables the one step fast cell search for GCL sequence elements, step 1112. To facilitate differential processing in accordance with the embodiment of the present invention, the sequence elements have preferably been generated in accordance with a sequence design methodology for a sequence length $N_p$ where a prime number $N_G$ is the smallest prime number larger than $N_p$. The integer "u" is the sequence index. The sequence elements were generated according to $$s_u(k) = \exp\left\{-j2\pi u \frac{k(k+1)}{2N_G}\right\}, k = 0 \ldots N_G - 1, \quad (1)$$

$$\text{and } u = 1 \ldots N_G - 1$$

$N_G-1$ sequence elements are generated having an optimal cyclic cross correlation between any pair of them. The sequence elements have been truncated to $N_p$ and distributed over $N_p$ subcarriers. Due to the oversampling introduced in OFDMA signaling with null subcarriers, and also the use of localized bandwidth for the synchronization signal, the PAPR will be degraded to different degrees for different "u" from the theoretical 0 dB value (at Nyquist sampling rate). If desired, indices that have the best PAPR among $N_G-1$ candidates can be chosen. The cell search sequences used by different cells are obtained from different indices "u" of these GCL sequence elements. The index "u" will also act as a cell ID.

The cell search 1112 determines directly the sequence indices "u" (and hence the strongest or candidate cell ID's or group ID's) from the received signal. First, the coarse OFDMA cell-search symbol timing is determined (e.g., using the time domain symmetry of the cell-search symbol). Then, the fractional part of the frequency offset is estimated and removed (e.g., based on the phase of the half-symbol differential correlation peak). After these steps, a block of N received time-domain samples representing the received cell-search symbol is transformed to the frequency domain using the usual FFT process.

Assuming that an integer frequency offset may still be present, the occupied subcarriers (even vs. odd) can be determined next by various techniques such as a maximum energy detector (e.g., total energy in the even subcarriers of the cell-search symbol vs. energy in the odd subcarriers). The frequency domain data on the occupied subcarriers as $Y(m)$ for $m=1$ to $N_p$ (i.e., ignoring the unused subcarriers) is denoted where $U_m$) is the GCL sequence mapped onto those subcarriers.

Next, a vector of "differential-based" values is computed based on the pairs of occupied subcarriers. These values, which are obtained by differentially demodulating the occupied subcarriers of the received symbol, are conveniently collected into vector format (e.g., a differential-based vector) for efficient FFT-based processing. The differential-based vector is computed as $$Z(m) = Y(m)^* Y^*(m+1), m=1, \ldots, N_p-1. \quad (2)$$

where "( )*" denotes conjugation. Other ways to obtain the "differential-based" vector may include, but are not limited to:

$$z(m)=Y(m)/Y(m+1), m=1, \ldots, N_p-1. \quad (3)$$

or $$Z(m)=Y(m)/Y(m+1)1/abs(Y(m)/Y(m+1)), m=1, \ldots, N_p-1. \quad (4)$$

where "abs( )" denotes the absolute value.

Assuming that there is only one base station, and that it is transmitting a cell-search symbol with a GCL sequence index of u, and that the channel does not change significantly between two adjacent occupied subcarriers, which is approximately satisfied as long as the spacing of occupied subcarriers is not too large, ignoring the channel amplitude and frequency offset, Y(m)*Y*(m+1) is approximately equal to $$Z(m) = Y(m) * Y^*(m+1) \approx |H(m)|^2 S_u(m) S_u^*(m+1)) = \quad (5)$$

$$|H(m)|^2 \exp\left\{j2\pi u \frac{m+1}{N_G}\right\}, m = 1, \ldots, N_p - 1$$

Thus, the sequence index information u is carried in the differential-based vector. In the multi-cell case, by processing the differential-based vector and identifying a set of prominent frequency components of the vector, we can identify the strongest cell index and one or more indices of potential handoff candidates as well. To obtain the frequency domain components, a commonly used tool is to take an FFT or IFFT (say T-point, T>=$N_p$-1) on {Z(m)} (step 1114) to get $$\{z(n)\}=IFFT_T(\{Z(m)\}), m=1, \ldots, N_p-1, n=1, \ldots, T. \quad (6)$$

The peak position (say $n_{max}$) of {z(n)} gives information about the strongest cell's index u, i.e., the mapping between the identified prominent frequency component at $n_{max}$ to a corresponding transmitted sequence index is determined as $$\frac{u}{N_G} = \frac{n_{max}}{T}. \quad (7)$$

The peak values are also rough estimates of the channel power at the occupied subcarriers. Thus, IFFT of the synchronization channel signal in the frequency domain is used to detect the frame boundary and decode the cell identification information 1114. Thus, utilizing the sequence index properties of the synchronization channel sequence elements, multiplying one sequence element by the complex conjugate of a next sequence element will derive the sequence index u 1114. Accordingly, in a single step, the controller 1010 can perform GCL sequence index detect to extract the cell specific information (e.g., u) from the synchronization channel signal. When the synchronization channel signal is determined to be, in some embodiments, the strongest synchronization channel signal 1116, wireless OFDMA communication is established with the base station 1118.

Note that for the purpose of explanation, the above equations were described for the case of the GCL sequence elements being mapped to different subcarriers of one OFDMA symbol period. However, the proposed detection method can also be applied when the sequence is mapped in other ways, such as "zig-zag". In general, the differential demodulation step can be performed over adjacent sequence elements even if the adjacent sequence elements are mapped to different OFMDA symbol periods and/or different subcarriers. In addition, the differential processing from multiple received instances of the synchronization channel can be combined to further improve the detection robustness. Multiple received instances of the synchronization channel may be available due to either receive diversity with multiple antennas, or from subsequently received synchronization signals that are transmitted periodically by the base station, for example.

As described for some embodiments of the invention, the time domain symmetry of the synchronization signal can be provided by mapping modulation symbols or sequence elements to even-numbered subcarriers in the localized synchronization channel bandwidth and zeros to other subcarriers in the localized synchronization channel bandwidth. Other embodiments of the invention may utilize other methods for providing time domain symmetry. One example includes mapping modulation symbols or sequence elements to every Nth subcarrier in the localized synchronization channel bandwidth and zeros to the other subcarriers in the localized synchronization channel bandwidth, where N is a positive integer, and where the subcarrier in the localized synchronization channel bandwidth containing the first of the every Nth subcarrier can be arbitrarily chosen. An additional example is to use modulation symbols or sequence elements that are purely real (i.e., their imaginary part is zero) in the localized synchronization channel bandwidth, since the Fourier transform of a real signal is symmetric in magnitude around its central portion. Methods of sequence design and/or mapping and/or signal repetition other than the provided examples can also be used to provide predetermined time domain symmetry.

Thus, it can be seen that the present invention provides an initial acquisition and cell search method utilizing interleaved synchronization channel signal sequence elements with low computational load and a small number of receiver processing steps which nevertheless provides the four main functions of initial acquisition and cell search (i.e., OFDMA symbol timing detection, frequency error detection, frame boundary detection and cell specific information detection) in an OFDMA system supporting multiple system bandwidths, both synchronized and un-synchronized systems, a large cell index and an OFDMA symbol structure with both short and long cyclic prefix length. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their equivalents.

What is claimed is:

1. A method for use in an orthogonal frequency domain multiple access (OFDMA) base station in a wireless communication system including a synchronization channel generator and transmitter circuitry, the method comprising the steps of:

generating a synchronization channel signal by the synchronization channel generator, the synchronization channel signal comprising a plurality of synchronization channel signal sequence elements including a first set of synchronization channel signal sequence elements and a second set of synchronization channel signal sequence elements, wherein the first set of synchronization channel signal sequence elements is based on a general chirp like (GCL) sequence with a sequence index defined in response to first partial cell identification information associated with the OFDMA base station, and wherein the second set of synchronization channel signal sequence elements is based on a second sequence other than a GCL sequence; and transmitting an OFDMA signal by the transmitter circuitry, the OFDMA signal including the synchronization channel signal and comprising a plurality of OFDMA symbol periods, wherein a first plurality of synchronization channel signal sequence elements are distributed over a first set of multiple proximal symbol periods of the plurality of OFDMA symbol periods and a second plurality of synchronization channel signal sequence elements are distributed over a second set of multiple proximal symbol periods of the plurality of OFDMA symbol periods.

2. The method of claim 1, wherein transmitting the OFDMA signal comprises transmitting the synchronization channel signal with time domain symmetry within a localized portion of bandwidth within which the synchronization channel is transmitted.

3. The method of claim 1, wherein the first partial cell identification information includes unique cell identification information identifying the base station within a group of base stations.

4. The method of claim 1, wherein the second sequence is a Pseudo-random Noise sequence.

5. The method of claim 1, wherein the second sequence is a maximal length binary sequence.

6. The method of claim 1, wherein the second sequence is a cyclically shifted maximal length binary sequence with a cyclic shift of the maximal length binary sequence defined in response to second partial cell identification information associated with the OFDMA base station.

7. The method of claim 6, wherein the second partial cell identification information includes cell group identification information.

8. The method of claim 1, wherein the step of generating the synchronization channel signal comprises including additional cell specific information in the synchronization channel signal, wherein the additional cell specific information includes frequency reference information.

9. The method of claim 1, wherein the step of generating the synchronization channel signal comprises including additional cell specific information in the synchronization channel signal, wherein the additional cell specific information includes transmission antenna information.

10. The method of claim 1, wherein the step of generating the synchronization channel signal comprises including additional cell specific information in the synchronization channel signal, wherein the additional cell specific information includes pilot stream information.

11. The method of claim 1, wherein the step of generating the synchronization channel signal comprises including additional cell specific information in the synchronization channel signal, wherein the additional cell specific information includes cyclic prefix length information.

12. The method of claim 1 wherein the OFDMA signal further comprises a plurality of subcarriers, and wherein the plurality of synchronization channel signal sequence elements are distributed over every Nth subcarrier of the plurality of subcarriers, where N is an integer greater than one.

13. The method of claim 12, wherein N equals 2.

14. An orthogonal frequency domain multiple access (OFDMA) base station comprising:

a synchronization channel generator generating a synchronization channel signal comprising a plurality of synchronization channel signal sequence elements including a first set of synchronization channel signal sequence elements and a second set of synchronization channel signal sequence elements, wherein the first set of synchronization channel signal sequence elements is based on a general chirp like (GCL) sequence with a sequence index defined in response to first partial cell identification information associated with the OFDMA base station, and wherein the second set of synchronization channel signal sequence elements is based on a second sequence other than a GCL sequence; and transmitter circuitry transmitting an OFDMA signal, wherein the OFDMA signal includes the synchronization channel signal and comprises a plurality of OFDMA symbol periods, wherein a first plurality of synchronization channel signal sequence elements are distributed over a first set of multiple proximal symbol periods of the plurality of OFDMA symbol periods and a second plurality of synchronization channel signal sequence elements are distributed over a second set of multiple proximal symbol periods of the plurality of OFDMA symbol periods.

15. The OFDMA base station of claim 14, wherein the synchronization channel signal is transmitted with time domain symmetry within a localized portion of bandwidth within which the synchronization channel is transmitted.

16. The OFDMA base station of claim 14, wherein the first partial cell identification information includes unique cell identification information identifying the base station within a group of base stations.

17. The OFDMA base station of claim 14, wherein the second sequence is a Pseudo-random Noise sequence.

18. The OFDMA base station of claim 14, wherein the second sequence is a maximal length binary sequence.

19. The OFDMA base station of claim 14, wherein the second sequence is a cyclically shifted maximal length binary sequence with a cyclic shift of the maximal length binary sequence defined in response to second partial cell identification information associated with the OFDMA base station.

20. The OFDMA base station of claim 19, wherein the second partial cell identification information includes cell group identification information.

21. The OFDMA base station of claim 14 wherein the synchronization channel signal further comprises cell specific information chosen from cell identification information, frequency reference information, transmission antenna information, pilot stream information, and cyclic prefix length information.

22. The OFDMA base station of claim 14 wherein the OFDMA signal further comprises a plurality of subcarriers, and wherein the plurality of synchronization channel signal sequence elements are distributed over every Nth subcarrier of the plurality of subcarriers, where N is an integer greater than one.

23. A method for use in an orthogonal frequency domain multiple access (OFDMA) base station in a wireless communication system including a synchronization channel generator and transmitter circuitry, the method comprising the steps of:

generating a synchronization channel signal by the synchronization channel generator, the synchronization channel signal comprising a plurality of synchronization channel signal sequence elements including a first set of synchronization channel signal sequence elements and a second set of synchronization channel signal sequence elements, wherein the first set of synchronization channel signal sequence elements is based on a general chirp like (GCL) sequence with a sequence index defined in response to first partial cell identification information associated with the OFDMA base station, and wherein the second set of synchronization channel signal sequence elements is based on a second sequence other than a GCL sequence; and transmitting an OFDMA signal by the transmitter circuitry, the OFDMA signal including the synchronization channel signal and comprising a plurality of OFDMA symbol periods, wherein a first plurality of synchronization channel signal sequence elements are distributed over a first set of multiple adjacent or proximal symbols within the plurality of OFDMA symbol periods and a second plurality of synchronization channel signal sequence elements are distributed over a second set of multiple adjacent or proximal symbols within the plurality of OFDMA symbol periods.

24. The method of claim 23, wherein the first set of multiple adjacent or proximal symbols includes first adjacent symbols, and the second set of multiple adjacent or proximal symbols includes second adjacent symbols.

25. The method of claim 23, wherein the first set of multiple adjacent or proximal symbols includes first proximal symbols, and the second set of multiple adjacent or proximal symbols includes second proximal symbols.

26. The method of claim 23, wherein the second sequence is a cyclically shifted maximal length binary sequence with a cyclic shift of the maximal length binary sequence defined in response to second partial cell identification information associated with the OFDMA base station.

27. An orthogonal frequency domain multiple access (OFDMA) base station comprising:

a synchronization channel generator generating a synchronization channel signal comprising a plurality of synchronization channel signal sequence elements including a first set of synchronization channel signal sequence elements and a second set of synchronization channel signal sequence elements, wherein the first set of synchronization channel signal sequence elements is based on a general chirp like (GCL) sequence with a sequence index defined in response to first partial cell identification information associated with the OFDMA base station, and wherein the second set of synchronization channel signal sequence elements is based on a second sequence other than a GCL sequence; and transmitter circuitry transmitting an OFDMA signal, wherein the OFDMA signal includes the synchronization channel signal and comprises a plurality of OFDMA symbol periods, wherein a first plurality of synchronization channel signal sequence elements are distributed over a first set of multiple adjacent or proximal symbols within the plurality of OFDMA symbol periods and a second plurality of synchronization channel signal sequence elements are distributed over a second set of multiple adjacent or proximal symbols within the plurality of OFDMA symbol periods.

28. The OFDMA base station of claim 27, wherein the first set of multiple adjacent or proximal symbols includes first adjacent symbols, and the second set of multiple adjacent or proximal symbols includes second adjacent symbols.

29. The OFDMA base station of claim 27, wherein the first set of multiple adjacent or proximal symbols includes first proximal symbols, and the second set of multiple adjacent or proximal symbols includes second proximal symbols.

30. The OFDMA base station of claim 27, wherein the second sequence is a cyclically shifted maximal length binary sequence with a cyclic shift of the maximal length binary sequence defined in response to second partial cell identification information associated with the OFDMA base station.

31. A method for use in an orthogonal frequency domain multiple access (OFDMA) base station in a wireless communication system including a synchronization channel generator and transmitter circuitry, the method comprising the steps of:

generating a synchronization channel signal by the synchronization channel generator, the synchronization channel signal comprising a plurality of synchronization channel signal sequence elements including a first set of synchronization channel signal sequence elements and a second set of synchronization channel signal sequence elements, wherein the first set of synchronization channel signal sequence elements is based on a general chirp like (GCL) sequence with a sequence index defined in response to first partial cell identification information associated with the OFDMA base station, and wherein the second set of synchronization channel signal sequence elements is based on a cyclically shifted maximal length binary sequence with a cyclic shift of the maximal length binary sequence defined in response to second partial cell identification information associated with the OFDMA base station; and transmitting an OFDMA signal by the transmitter circuitry, the OFDMA signal including the synchronization channel signal and comprising a plurality of OFDMA symbol periods, wherein the plurality of synchronization channel signal sequence elements are distributed over more than one proximal symbol periods of the plurality of OFDMA symbol periods, at least some of the more than one proximal symbol periods of the plurality of OFDMA symbol periods having a time spacing therebetween of more than one OFDMA symbol period, wherein a first group of the plurality of synchronization channel signal sequence elements is distributed over a first set of OFDMA symbol periods of the more than one proximal symbol periods of the plurality of OFDMA symbol periods and a second group of the plurality of synchronization channel signal sequence elements is distributed over a second set of OFDMA symbol periods of the more than one proximal symbol periods of the plurality of OFDMA symbol periods.

32. An orthogonal frequency domain multiple access (OFDMA) base station comprising:

a synchronization channel generator configured to generate a synchronization channel signal, the synchronization channel signal comprising a plurality of synchronization channel signal sequence elements including a first set of synchronization channel signal sequence elements and a second set of synchronization channel signal sequence elements, wherein the first set of synchronization channel signal sequence elements is based on a general chirp like (GCL) sequence with a sequence index defined in response to first partial cell identification information associated with the OFDMA base station, and wherein the second set of synchronization channel signal sequence elements is based on a cyclically shifted maximal length binary sequence with a cyclic shift of the maximal length binary sequence defined in response to second partial cell identification information associated with the OFDMA base station; and transmitter circuitry configured to transmit an OFDMA signal, the OFDMA signal including the synchronization channel signal and comprising a plurality of OFDMA symbol periods, wherein the plurality of synchronization channel signal sequence elements are distributed over more than one proximal symbol periods of the plurality of OFDMA symbol periods, at least some of the more than one proximal symbol periods of the plurality of OFDMA symbol periods having a time spacing therebetween of more than one OFDMA symbol period, wherein a first group of the plurality of synchronization channel signal sequence elements is distributed over a first set of OFDMA symbol periods of the more than one proximal symbol periods of the plurality of OFDMA symbol periods and a second group of the plurality of synchronization channel signal sequence elements is distributed over a second set of OFDMA symbol periods of the more than one proximal symbol periods of the plurality of OFDMA symbol periods.

* * * * *